US009322157B1

(12) United States Patent
Ismert

(10) Patent No.: US 9,322,157 B1
(45) Date of Patent: Apr. 26, 2016

(54) MECHANICALLY COUPLED DRAIN FIXTURE AND OUTLET FITTING

(71) Applicant: Sioux Chief Mfg. Co., Inc., Peculiar, MO (US)

(72) Inventor: Dominic P. Ismert, Kansas City, MO (US)

(73) Assignee: Sioux Chief Mfg. Co., Inc., Peculiar, MO (US)

( * ) Notice: Subject to any disclaimer, the term of this patent is extended or adjusted under 35 U.S.C. 154(b) by 66 days.

(21) Appl. No.: 14/192,123

(22) Filed: Feb. 27, 2014

Related U.S. Application Data

(60) Provisional application No. 61/771,329, filed on Mar. 1, 2013.

(51) Int. Cl.
*E03F 5/00* (2006.01)
*E03F 5/04* (2006.01)
*F16L 37/248* (2006.01)

(52) U.S. Cl.
CPC ............. *E03F 5/0407* (2013.01); *F16L 37/248* (2013.01)

(58) Field of Classification Search
CPC ...... F16L 37/248; F16L 37/107; E03F 5/0407
USPC ........................................................ 137/362
See application file for complete search history.

(56) References Cited

U.S. PATENT DOCUMENTS

| 506,669 | A | 10/1893 | Clifford |
| 2,225,693 | A | 12/1940 | Frances |
| 3,397,902 | A | 8/1968 | Dutcher |
| 3,411,628 | A | 11/1968 | Mason |
| 3,742,525 | A | 7/1973 | Oropallo |
| 3,744,065 | A | 7/1973 | Yavitch |
| 3,896,511 | A | 7/1975 | Cuschera |
| 4,123,810 | A | 11/1978 | Oropallo |
| 4,423,527 | A | 1/1984 | Morris et al. |
| 4,562,602 | A | 1/1986 | Cuschera |
| 4,730,854 | A | 3/1988 | Cuschera |
| 4,984,309 | A | 1/1991 | Lowry |
| 5,143,346 | A * | 9/1992 | Chen .......................... 251/149.5 |
| 5,356,183 | A * | 10/1994 | Cole ............................ 285/305 |
| 6,049,921 | A | 4/2000 | Erbs |
| 6,145,136 | A | 11/2000 | Parisi et al. |
| 6,175,971 | B1 | 1/2001 | O'Neill |
| 6,546,573 | B1 | 4/2003 | Ball |
| 6,755,966 | B1 | 6/2004 | Reed |
| 2007/0236002 | A1 | 10/2007 | Knight |
| 2008/0277324 | A1 | 11/2008 | Meyers |
| 2010/0043136 | A1 | 2/2010 | Michael |
| 2010/0320130 | A1 | 12/2010 | Meyers |
| 2012/0036632 | A1 | 2/2012 | Cook |
| 2012/0037553 | A1 | 2/2012 | Silverstein et al. |

* cited by examiner

*Primary Examiner* — Kevin Lee
(74) *Attorney, Agent, or Firm* — Erickson Kernell Derusseau & Kleypas, LLC

(57) ABSTRACT

A drain fixture with a mechanically coupleable outlet fitting is described. The drain fixture includes a drain body having an aperture in a bottom floor thereof. A coupler with cylindrical body is inserted through the aperture such that the body extends below the floor. An outlet fitting is disposed beneath the floor and receives the body of the coupler therein. The outlet fitting includes a plurality of projections in an interior surface thereof that are received by respective channels in the body of the coupler. The outlet fitting is rotated with respect to the coupler to mechanically join the two together, such as in a bayonet-style coupling. The joining traps the floor of the drain body between flanges of the coupler and the outlet fitting. Downstream tubing can be coupled to the outlet fitting as desired.

20 Claims, 5 Drawing Sheets

MECHANICALLY COUPLED DRAIN FIXTURE AND OUTLET FITTING

CROSS-REFERENCE TO RELATED APPLICATIONS

This application claims the benefit of U.S. Provisional Patent Application No. 61/771,329 filed Mar. 1, 2013, the disclosure of which is hereby incorporated herein, in its entirety, by reference.

BACKGROUND

Drain fixtures, such as floor drains, for plumbing applications are typically manufactured as a single component that includes a drain pan or body with an integral outlet fitting extending from a bottom surface thereof. These fixtures have several drawbacks: they must be manufactured from a single material thus requiring the entire fixture to be made from either relatively expensive metals or from a glueable or solvent weldable plastic material in order to provide an outlet fitting that is glueable or solvent weldable; the integration of the outlet fitting with the drain pan gives the fixtures a form or shape that is difficult to stack for storage and shipping; and the types of outlet fittings available are limited by manufacturing and tooling costs, among other drawbacks.

Attempts have been made to provide drain fixtures with separate drain bodies and outlet fittings. For example, U.S. Pat. No. 4,562,602 to Cuschera discloses a drain having an enlarged drain body with a hole through a lower floor thereof. A hollow coupling member with an annular flange at a first end and a threaded portion adjacent thereto is provided. A second end of the coupling member is inserted through the floor to form a stem for the drain fixture. A nut is threaded onto the threads from beneath the floor to thereby secure the floor of the drain body between the nut and the annular flange on the coupling member. Downstream fittings for the drain system can then be coupled to the second end of the coupling member using a sleeve or other fitting. Such a design requires subsequent fittings to be coupled to the stem of the coupling member and relies on a threaded coupling which may be difficult to appropriately tighten and has the potential to loosen over time.

It would be advantageous to provide a drain fixture having a separate drain body and outlet fitting that can be mechanically coupled to provide an engineered seal and that can be manufactured from dissimilar materials. It would also be advantageous to provide a plurality of styles of outlet fittings, e.g. Ts, 45s, elbows, or the like, that can be selectively coupled to a drain body via a common coupler disposed in the drain body. A drain fixture that is adaptable to a variety of outlet fittings and downstream tubing sizes or diameters would also be advantageous.

SUMMARY

A high-level overview of various aspects of the invention are provided here to provide an overview of the disclosure, and to introduce a selection of concepts that are further described in the Detailed-Description section below. In brief, this disclosure describes, among other things, a drain fixture that includes a drain body and an outlet fitting formed as separate components that are mechanically coupled together.

The drain body includes an aperture through a bottom panel or floor thereof. The outlet fitting may comprise any type or shape of fitting, such as a straight fitting or an elbow, and includes a plurality of raised connection features extending from an interior surface and proximate to a first end thereof. The first end of the outlet fitting includes an annular flange configured to abut the bottom surface of the drain body floor. A coupler that has a cylindrical sidewall dimensioned to fit through the aperture in the drain body floor and into the first end of the outlet fitting is also provided. The coupler includes an annular flange configured to abut the upper surface of the floor of the drain body and the sidewall includes recesses, cutouts, channels, or other features configured to accept and mechanically couple to the connection features on the interior of the outlet fitting, such as in a bayonet-style coupling.

As such, the coupler is inserted through the floor of the drain body from above. The outlet fitting mechanically couples to the coupler from below the drain body to capture the floor of the drain body between the annular flanges of the coupler and the outlet fitting. A downstream tube or pipe can be coupled to an opposite end of the outlet fitting.

DESCRIPTION OF THE DRAWINGS

Illustrative embodiments of the invention are described in detail below with reference to the attached drawing figures, and wherein.

DETAILED DESCRIPTION

The subject matter of select embodiments of the invention is described with specificity herein to meet statutory requirements. But the description itself is not intended to necessarily limit the scope of embodiments of the invention. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Figure 1:
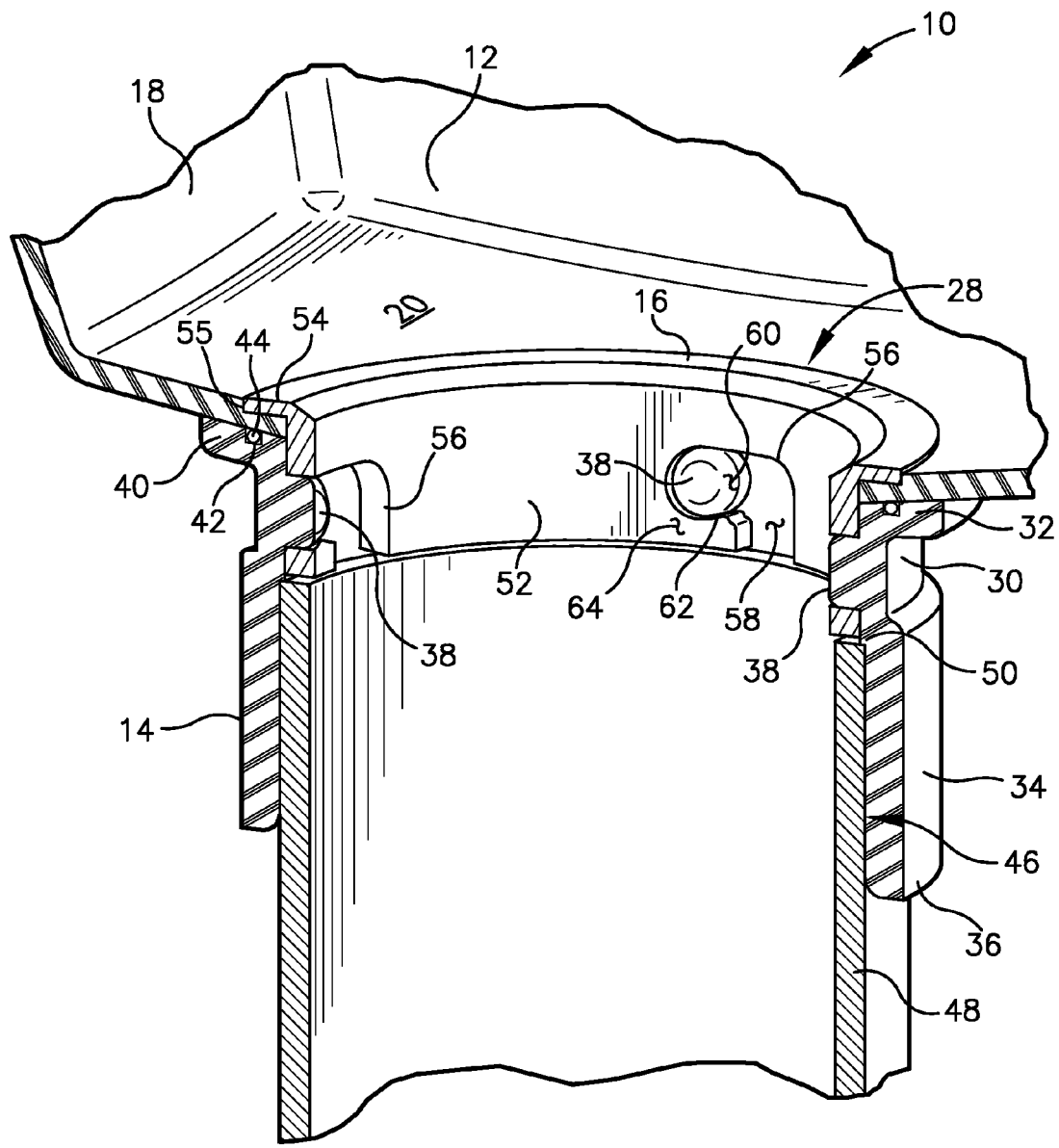
FIG. 1 is a perspective cross-sectional view of a drain fixture with a modular outlet fitting depicted in accordance with an embodiment of the invention.
Figure 2:
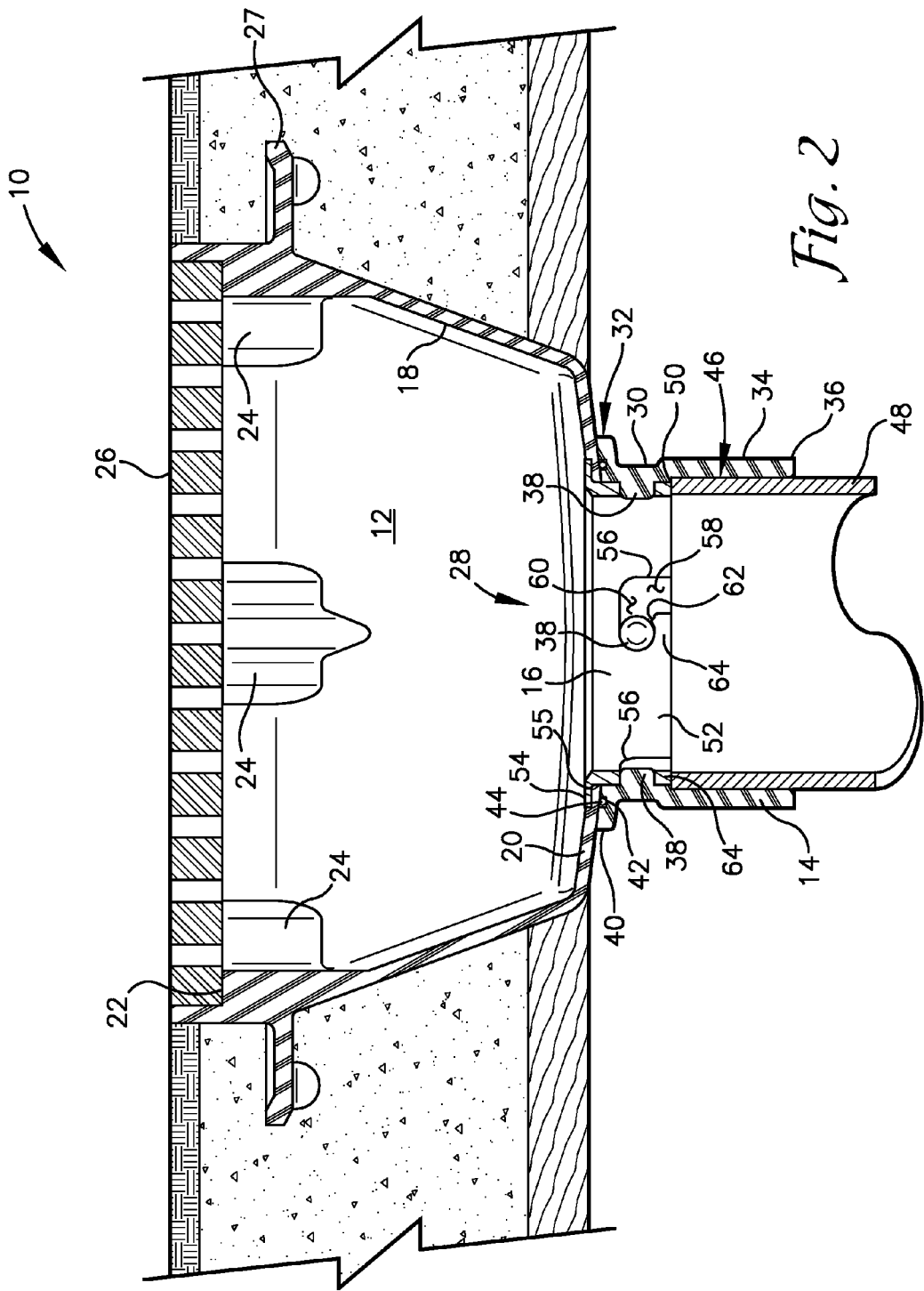
FIG. 2 is a cross-sectional, side elevational view of the drain fixture of FIG. 1.
Figure 3:
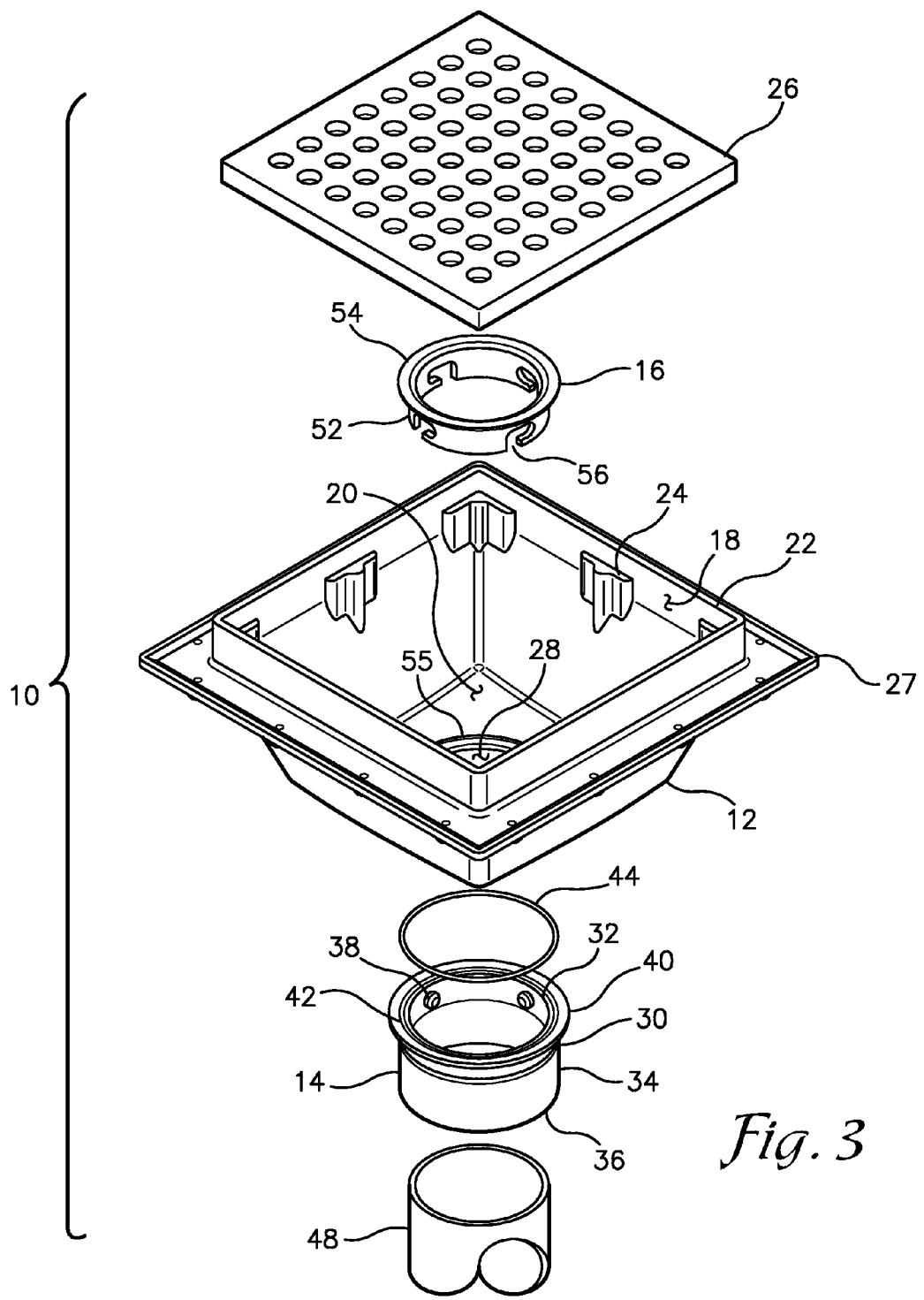
FIG. 3 is an exploded view of the drain fixture of FIG. 1.

With reference to FIGS. 1-3, a drain fixture is described in accordance with an embodiment of the invention and is referred to generally by the reference numeral 10. The drain fixture 10 comprises a drain fixture head or body 12, an outlet fitting 14, and a coupler 16. The drain body 12 includes sidewall 18 that extends about a perimeter of a lower wall or floor 20 of the body 12 to form a dish, trough, or other depressed basin. A distal edge of the sidewall 18 includes one or more features, such as a lip 22 and a plurality of bosses 24 configured to receive and attach a strainer, grate, or other cover 26 over the drain body 12. A cover or strainer 26 is typically formed separate from the drain body 12. A mounting flange 27 is provided extending about an exterior perimeter of the drain body 12 to aid in securing the drain body 12 in a floor or other surface.

Although a particular configuration of the drain body 12 is depicted and described herein, such is not intended to be limiting. The drain body 12 can take any configuration available in the art for use in a desired application. For example, the drain body 12 might have a generally cubical, cylindrical, or other overall shape and can be configured for use in wood, concrete, metal, stone, or other surfaces or in fixtures like sinks, tubs, and the like.

The floor 20 of the drain body 12 includes an aperture or opening 28 extending therethrough. The aperture 28 is generally centrally located in the floor 20 but may be otherwise located. The floor 20 typically slopes downwardly toward the aperture 28 to aid in directing fluid flow toward the aperture 28 but such is not required.

The outlet fitting 14 is shown in FIGS. 1-3 as comprising a straight stem fitting but, any style fitting including, for example, elbows, Ts, Ys, unions, and the like are useable in embodiments of the invention. The outlet fitting 14 is dimensioned with an inner diameter that is approximately equal to that of the aperture 28 in the floor 20 of the drain body 12 but in embodiments may have a larger or smaller dimension.

The outlet fitting 14 includes a connection portion or coupler mating socket 30 that is proximate to a first or upstream end 32 of the outlet fitting 14 and a stem portion 34 that is proximate a second or downstream end 36. The connection portion 30 is configured to mechanically couple the outlet fitting 14 to the coupler 16. A plurality of projections 38, nubs, flanges, protuberances, or other raised features extend radially inward from the interior face of the outlet fitting 14. The projections 38 are cylindrical in shape and are equally spaced about the interior circumference of the connection portion 30, but may comprise any desired shape and arrangement.

A radially extending flange 40 is provided about the first end 32 of the outlet fitting 14. The flange 40 has a diameter that is greater than that of the aperture 20 in the floor 20 of the drain body 12. The flange 40 may include a recess or channel 42 in a surface thereof configured to receive an O-ring 44, gasket, or functionally comparable resilient sealing member therein. In an alternative embodiment, the O-ring 44 rests on or is affixed to the flange 40 without the provision of the channel 42 or other similar feature.

As indicated previously, the stem portion 34 of the outlet fitting 14 shown in the drawings is configured as a straight stem fitting, e.g. the outlet fitting 14 has a single socket 46 within which a pipe 48 of a downstream plumbing drain system can be connected to the drain fixture 10; other fitting styles may have a different number of sockets 46. The socket 46 is configured to receive an end of the drain pipe 48 therein. A shoulder 50, interior flange, or the like can be provided about the circumference of the interior wall of the stem portion 34 at a terminating end thereof. The shoulder 50 provides a surface against which the end of the pipe 48 abuts when fully inserted into the stem portion 34.

As depicted in FIGS. 1-2, the socket 46 has an interior face configured for chemically joining, such as by solvent welding, with an end of the pipe 48. The interior face can be configured with any desired features to aid in the chemical joining. The features can be prescribed by building codes and other known standards. For example, the interior face might be tapered inwardly as is known in the art for DWV (drain/waste/ventilation) fittings.

The outlet fitting 14 of embodiments of the invention is described herein with respect to PVC (polyvinyl chloride) pipe for DWV systems, but such is not intended to restrict embodiments to any particular material or application. Any materials configured for a desired application can be employed for the outlet fitting 14 as well as for the drain body 12, the coupler 16, and other components of the drain fixture 10 and are within the scope described herein. For example, CPVC (chlorinated polyvinyl chloride), ABS (acrylonitrile butadiene styrene), PVDF (polyvinylidene fluoride), polypropylene, polyethylene, copper, aluminum, steel, or cast iron for water, acid, or other plumbing applications might be used. Further, the outlet fitting 14, drain body 12, and coupler 16 can each comprise different or like materials in a given application. For example, the drain body 12 might be constructed from a stainless steel stamping for corrosion resistance, appearance features, and costs while the outlet fitting 14 and coupler 16 might be PVC components to allow connection to downstream plumbing components via gluing or solvent welding as described more fully below.

The chemical joining between the outlet fitting 14 and the pipe 48 is completed by any available method. Preferably, the joint is formed through a solvent welding process whereby a primer and solvent or cement are applied to the interior face of the socket 46 and the exterior of the pipe 48 prior to insertion of the pipe 48 into the socket 46, but other chemical joining processes can be employed. Solvent welding of PVC fittings and pipe often employs a primer comprised of a combination of chemicals like tetrahydrofuran, methyl ethyl ketone, acetone, and cyclohexanone, and a solvent or cement comprised of similar ingredients along with a PVC resin among other ingredients. The solvent welding process may melt the interior surface of the socket 46 and the exterior surface of the pipe 48 together. Other chemical joining processes might employ glues, adhesives, solvents, epoxies, or the like.

In another embodiment, an electro-welding process is employed in place of the solvent welding process. Resistance wires or elements (not shown) are molded into the interior face of the socket 46. The pipe 48 is inserted therein and an electrical current is applied to the resistance elements to melt the interior face and the pipe 48 together. Mechanical joining methods can also be employed to join the pipe 48 with the outlet fitting 14. For example, compression fittings, friction fittings, and the like can be employed.

With continued reference to FIGS. 1-2, the coupler 16 comprises a cylindrical sidewall 52 with an annular flange 54 extending radially outward from a first end 56 thereof. The sidewall 52 has an exterior diameter sized to fit through the aperture 28 in the floor 20 of the drain body 12. The annular flange 54 extends to a diameter greater than that of the aperture 28 to obstruct passage of the coupler 16 through the aperture 28 in the floor 20. As depicted in FIGS. 1-2, the upper surface of the floor 20 of the drain body 12 includes an annular recess 55 about the perimeter of the aperture 28; the annular flange 54 on the coupler 16 is preferably dimensioned to fit within the recess 55. In one embodiment, the annular flange 54 and the floor 20 include one or more mating features (not shown) that engage to resist rotation of the coupler 16 with respect to the floor 20, e.g. the annular flange 54 might include a stud extending downwardly from a bottom surface thereof that engages a corresponding cavity in the top surface of the floor 20.

The sidewall 52 includes a plurality of bayonet-style channels 56 formed therein and spaced around the circumference of the sidewall 52 to align with a respective one of the projections 38 on the interior face of the outlet fitting 14. As depicted in FIGS. 1-3, the channels 56 extend through the width of the sidewall 52, but in other embodiments might be contained within an exterior surface of the sidewall 52, e.g. not visible from inside the coupler 16.

The channels 56 are open to a distal edge of the sidewall 52 opposite the annular flange 54 and include a first portion 58 that extends along the sidewall 52 toward the annular flange 54 a first distance. A second portion 60 extends at an angle to the first portion 58 about a portion of the circumference of the sidewall 52 a second distance. The angle of the second portion 60 is generally perpendicular to the first portion 58 but is preferably angled at least slightly toward the annular flange 54. The shape of the channels may generally be referred to as a dog leg and the second portion 60 may be described as extending circumferentially around the sidewall.

One or more detents 62, notches, tabs, ribs, or the like are included along the second portion 60 to engage a projection 38 of the interior face of the outlet fitting 14 as described below. The detents 62, tabs, ribs, and/or one or more additional features in one or more of the channels 56 may act as a locking feature to restrict or lock a projection 38 from withdrawal from a respective channel 56.

Gripping features (not shown) might also be provided on an interior surface of the sidewall 52 or on a top surface of the annular flange 54 to aid in gripping the coupler 16 by hand and/or with a hand tool. The gripping features comprise ribs, recesses, flanges, tabs, or the like. Gripping features might also be provided on an exterior surface of the outlet fitting 14 to similarly aid in gripping the outlet fitting 16 by hand and/or with a hand tool.

A hand tool (not shown) may be provided to aid in rotation of the outlet fitting 14 with respect to the coupler 16 and/or vice-versa. The hand tool may be configured similarly to a spanner wrench and may include flanges or other features to engage the gripping features on the exterior of the outlet fitting 14 or interior of the coupler 16. The hand tool might also include one or more features configured to disengage locking features included in the channels 56 to allow the coupler 16 to be removed from coupling with the outlet fitting 14 as described below.

With continued reference to FIGS. 1-3, installation of the drain fixture 10 is described in accordance with an embodiment of the invention. Installation of the drain fixture 10 can take one of several different paths. The outlet fitting 14 can be coupled to the drain body 12 prior to or after installation of the drain body 12 in a surface. The outlet fitting 14 might also be first coupled to the pipe 48 of the down stream plumbing system prior to coupling to the drain body 12. Further, coupling of the outlet fitting 14 to the coupler 16 can be accomplished by rotating the outlet fitting 14, the coupler 16, or both. As such, for sake of clarity, the installation of the outlet fitting 14 on the drain body 12 is described below without reference to whether the drain body 12 is installed in a surface.

Initially, an appropriate fitting-style for the outlet fitting 14 is selected for a particular application by methods known in the art. For example, an elbow or T-style fitting might be chosen. The outlet fitting 14 can also be selected based on dimensions needed for coupling to the pipe 48 of the plumbing system or the dimensions of the drain body 12 and the aperture 28 therein.

Selection of the outlet fitting 14 also includes selection of a type of joining that will be used to join the outlet fitting 14 to the downstream plumbing system and the pipe 48. For example, a PVC outlet fitting 14 might be chosen when a solvent welding process is to be used to join the outlet fitting 14 with the pipe 48. Or a cast iron outlet fitting 14 might be chosen for joining to a cast iron piping via a threaded coupling on the tubing 48 as known in the art. Similarly, a drain body 12 having a desired configuration and that is comprised of a suitable material for a given application is chosen. The drain body 12 and the outlet fitting 14 are not required to be comprised of the same material but they can be.

To join the outlet fitting 14 to the drain body 12, the coupler 16 is first inserted through the aperture 28 in the floor 20 of the drain body 12 such that the annular flange 54 of the coupler 16 rests against the upper surface of the floor 20 and the sidewall 52 extends through and below the floor 20.

The first end 32 of the outlet fitting 14 is aligned with the coupler 16 to receive the sidewall 52 within the connection portion 30 of the outlet fitting 14. The projections 38 in the connection portion 30 of the outlet fitting 14 are aligned with the channels 56 in the coupler 16 and the outlet fitting 14 is pressed toward the coupler 16 to engage the projections 38 in the first portion 58 of the channels 56. The outlet fitting 14 is rotated with respect to the coupler 16 to advance the projections 38 in or relative to the second portion 60 of the channels 56. When necessary, the outlet fitting 14 and the coupler 16 may be rotated together as a unit to provide a desired alignment or directionality for the outlet fitting 14. For example, when the outlet fitting 14 comprises an elbow-style fitting the outlet fitting 14 and coupler 16 can be rotated as a unit with respect to the drain body 12 to direct the elbow in a desired direction.

Continued rotation of the outlet fitting 14 with respect to the coupler 16 draws the outlet fitting 14 toward the coupler 16 and vice-versa due to the slight angle of the second portion 60 of the channel 56 toward the annular flange 54 of the coupler 16. Rotation of the outlet fitting 14 also engages the projections 38 with the detents 62 in the channel 56. Engagement of the projections 38 with the detents 62 aids to resist rotation of the outlet fitting 14 in a reverse direction and removal of the outlet fitting 14 from its coupling with the coupler 16. The projections 38 might also engage a locking feature (not shown) such as a flexible tab that allows passage of the projections 38 through the channel 56 in a first direction but restricts movement in an opposite direction. Engagement of the projections 38 with the detents 62 and/or locking features can provide an audible indication, such as a click, that indicates to an installer that the proper rotation has been achieved.

Drawing of the outlet fitting 14 toward the coupler 16 also presses the annular flanges 40 and 54 against the bottom and top surfaces of the floor 20 of the drain body 12, respectively. The floor 20 is thereby sandwiched between the annular flanges 40 and 54. The O-ring 44 is trapped and compressed between the annular flange 40 of the outlet fitting 14 and the bottom surface of the floor 20 of the drain body 12 to form a seal therebetween. One or more lubricants, sealants, or other materials can be applied to the exterior face of the coupler 16, the interior face of the outlet fitting 14, the flanges 40, 54, and/or the O-ring 44 as desired to aid in forming a seal therebetween.

Compression of the O-ring 44 also provides a force on the outlet fitting 14 directed away from the drain body 12 and coupler 16. This force aids to retain the projections 38 in the detents 62 of the coupler 16. Additionally, portions 64 of the coupler 16 that extend between the channels 56 and the distal edge of the sidewall 52 might also at least partially flex to aid in engagement of the projections 38 with the detents 62.

The mechanical joint created by the interaction of the projections 38 and the channels 56 can be engineered to provide a desired amount of compression of the O-ring 44 and stresses or forces on the outlet fitting 14 and coupler 16. Further, these forces can be kept within a set tolerance from one application or joint to another due to the set mechanical engagement between the outlet fitting 14 and the coupler 16. In contrast, such tolerances are not ensured by designs that employ, for example, a threaded connection without taking additional steps like using a calibrated torque wrench to tighten the threaded connection. The drain fixture 10 of embodiments of the invention can ensure that a proper seal is provided between the outlet fitting 14 and the drain body 12 based on the engineered design by simply coupling the outlet fitting 14 and coupler 16 as described above.

Rotation of the outlet fitting 14 can be completed by hand and/or through the use of the hand tool described above. Multiple detents 62 might be provided in the channels 56 to provide increasing levels of compressive force on the O-ring 44 and resistance to reverse rotation of the outlet fitting 14. In an embodiment, the outlet fitting 14 is rotated by hand to engage a first detent 62; the hand tool is then used to rotate the outlet fitting 14 to engage a subsequent detent 62 and/or locking feature. The hand tool might be employed to rotate the outlet fitting 14 when doing so requires too much force for rotation by hand. The coupler 16 might also be rotated in addition to or instead of the outlet fitting 14 in a similar fashion, e.g. by hand or using the hand tool. For example, the outlet fitting 14 and the coupler 16 might be simultaneously rotated in opposite directions or the outlet fitting 14 might remain still while the coupler 16 is rotated to engage the projections 38 in the channels 56.

In an embodiment, the channels 56 are configured to provide sufficient compression of the O-ring 44 while minimizing the amount of rotation required of the outlet fitting 14 and/or the coupler 16. Rotation of the fittings 14, 16 is preferably less than half of a rotation, e.g. less than 180 degrees, or about ¼ rotation, or more preferably about ⅛ rotation. Minimizing the rotation aids in installation in confined spaces where available movement of the hand tool to rotate the outlet fitting 14 and/or the coupler 16 is limited. This also avoids moving the outlet fitting 14 and any attached components out of a desired alignment during installation.

The configuration the drain fixture 10 of embodiments of the invention provides greater flexibility and efficiency for storage, shipping, and display of the available components. By providing a separate drain body 12 and outlet fitting 14, the components can be more easily stacked and transported. The drain body 12 can be nested or stacked with other similar drain bodies 12 and the outlet fittings 14 and couplers 16 can be boxed, bundled, or otherwise grouped and shipped or stored separately. The drain body 10 might be supplied with the couplers 16 and/or outlet fittings 14 included as a set or kit or the fittings 14, 16 can be supplied separately as needed by installers.

Figure 4:
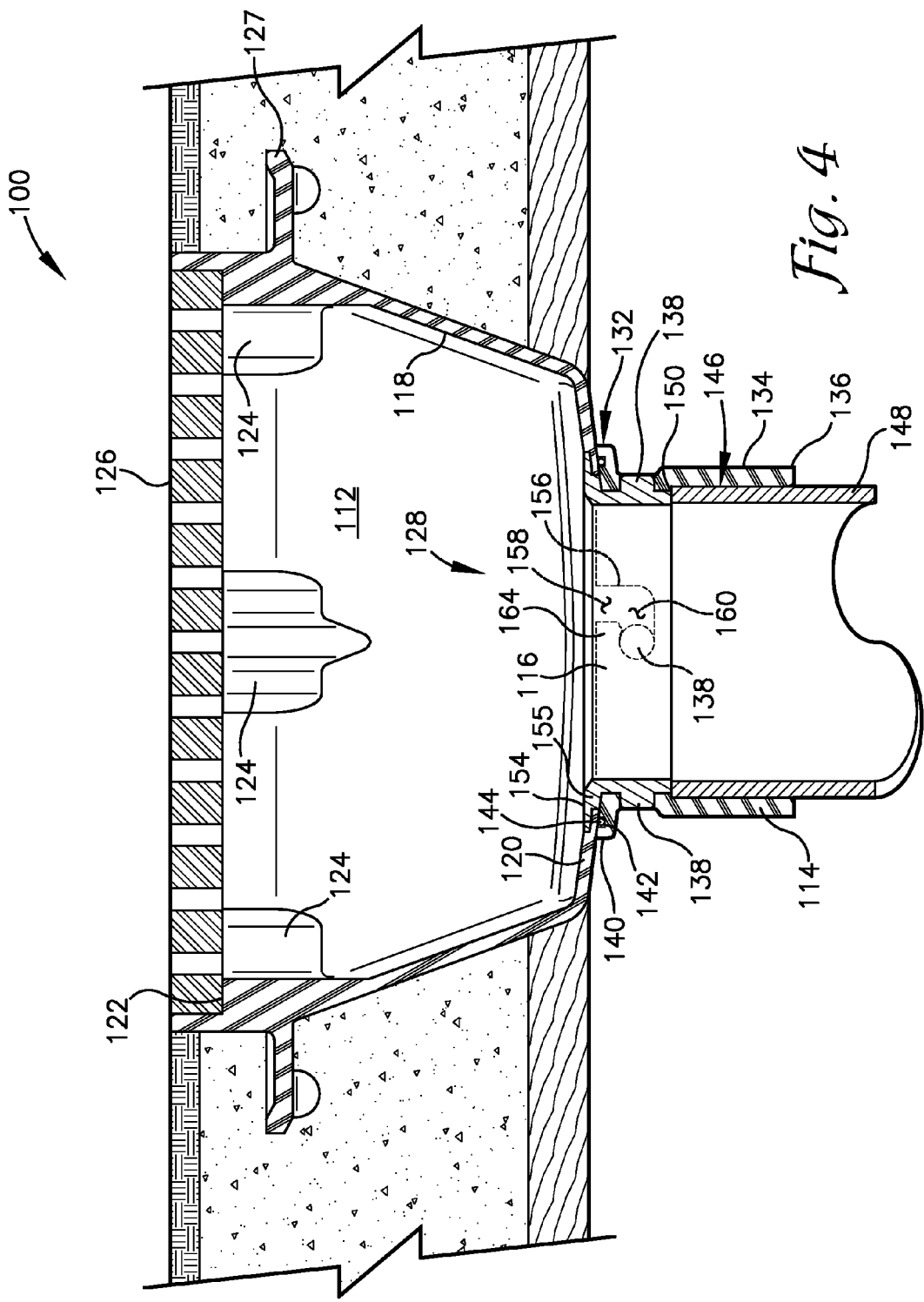
FIG. 4 is a cross-sectional, side elevational view of a drain fixture having projections on a coupler and channels on an outlet fitting depicted in accordance with an embodiment of the invention.

Although the first and second mating components used to form a mechanical coupling between the outlet fitting 14 and the coupler 16 are shown as a projection 38 on the inner surface of the outlet fitting 14 and a slot or channel 56 in the coupler 16, it is to be understood that other arrangements could be utilized. For example, as depicted in FIG. 4 which depicts a drain fixture 100 in accordance with another embodiment of the invention, it is foreseen that projections could be formed on an outer surface of the coupler 116 and slots or channels 156 formed in an inner surface of the outlet fitting 114 for mechanically coupling the outlet fitting 114 to the coupler 116. Features of the drain fixture 100 that are similar to those of the drain fixture 10 described above are provided with reference numerals having matching second and third digits, e.g. the drain body 12 of the drain fixture 10 is similar to the drain body 112 of the drain fixture 100. Such is not intended to indicate that those features are necessarily the same.

The drain fixture 100 is configured with the orientation of the coupling between the outlet fitting 114 and the coupler 116 reversed with respect to that of the drain fixture 10. As such, the projections 138 are disposed on the coupler 116 and project radially outwardly from an outer wall thereof while the dog leg channels 156 are disposed in the outlet fitting 114. The aperture 128 in the floor 120 of the drain body 112 is also provided with a diameter that is equal to or greater than a diameter of the coupler 116 formed between distal ends of the projections 138 to enable the projections 138 to pass through the aperture 128. In another embodiment, the aperture 128 includes a plurality of notches or cutouts that can be aligned with the projections 138 to enable the projections 138 to pass through the aperture 128.

Accordingly, to assemble the drain fixture 100, the coupler 116 is inserted in the aperture 128 to engage the flange 154 with an upper surface of the floor 120 of the drain body 112. The first end 132 of the outlet fitting 114 is aligned with the coupler 116 to receive the coupler 116 therein. The projections 138 on the coupler 116 are aligned with the channels 156 in the outlet fitting 114 and the outlet fitting 114 is pressed toward the coupler 116 to engage the channels 156 with the projections. The outlet fitting 114 is rotated with respect to the coupler 116 to advance the circumferentially extending second portion 160 of channels 156 relative to the projections 138.

Figure 5:
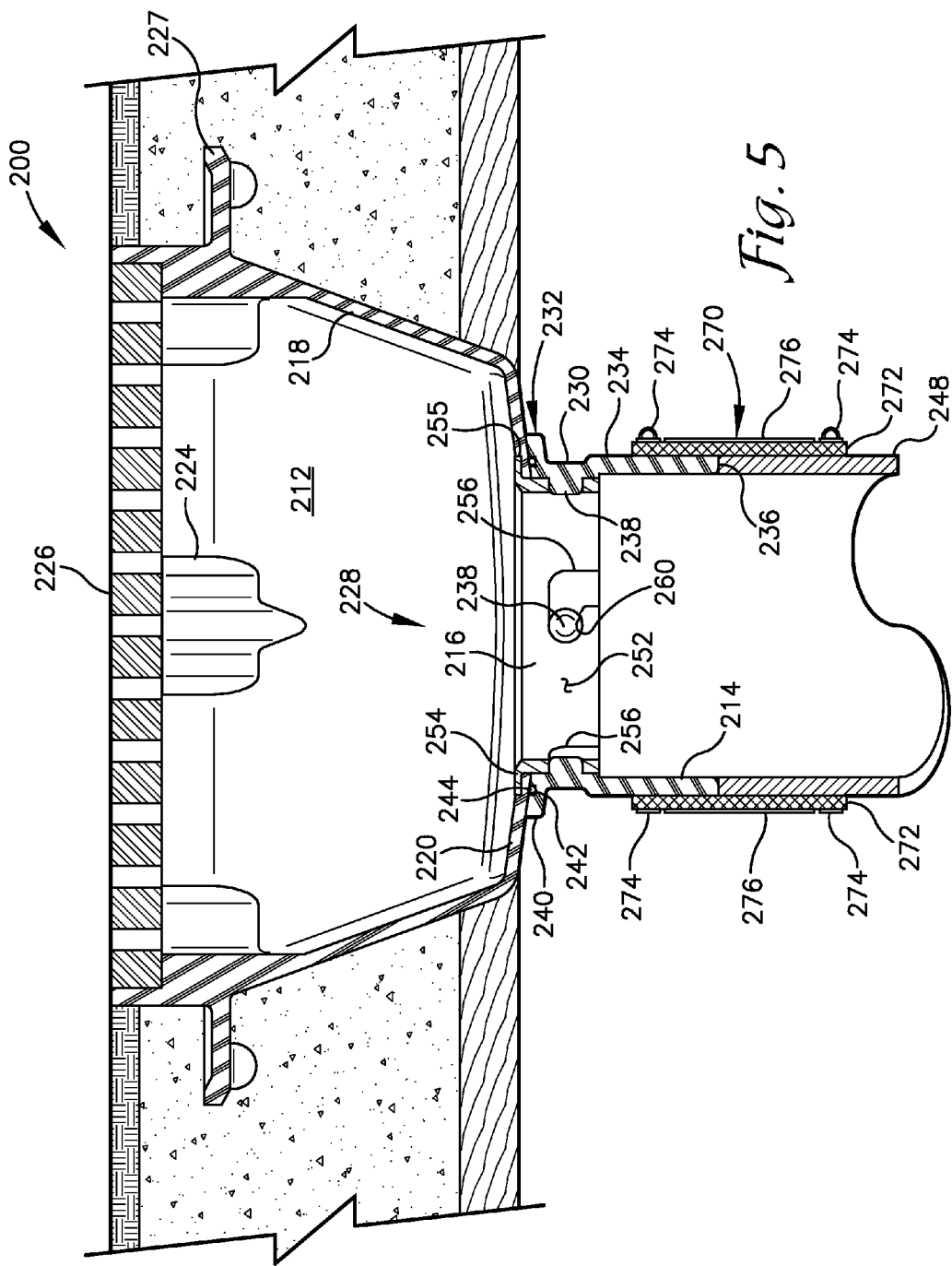
FIG. 5 is cross-sectional, side elevational view of a drain fixture having an outlet fitting coupled to a plumbing system via a no-hub coupling depicted in accordance with an alternative embodiment of the invention.

Referring now to FIG. 5, a drain fixture 200 is described in accordance with an embodiment of the invention. Features of the drain fixture 200 that are similar to those of the drain fixture 10 and 100 described above are provided with reference numerals having matching second and third digits. Such is not intended to indicate that those features are necessarily the same. The drain fixture 200 is depicted with the drain body 212, outlet fitting 214, and coupler 216 configured similarly to that of the drain fixture 10 but may alternatively be configured like that of the drain fixture 100.

The outlet fitting 214 of the drain fixture 200 is configured to provide an end-to-end or "no-hub" connection with a tube 248 of a downstream plumbing system. The stem portion 234 of the outlet fitting 214 is dimensioned similarly to the tube 248 to enable the downstream end 236 of the outlet fitting 214 to be abutted against an end of the tube 248. A coupling 270 known in the art as a "no-hub" coupling can thus be employed to couple the outlet fitting 214 to the tube 248. In one embodiment, the downstream end 236 and the tube 248 are spaced apart within the coupling 270. In another embodiment, the outlet fitting 214 can be inserted into a socket of a hub- or slip-type fitting for coupling thereto.

The coupling 270 comprises a no-hub coupling available in the art. The coupling 270 includes a sleeve 272 comprised of a flexible material, such as a rubber and a pair of clamps 274 or other attachment members. The sleeve 272 is disposed around the stem portion 234 of the outlet fitting 214 and a proximate end of the tube 248 overlapping a joint or gap therebetween. A clamp 274 is disposed adjacent to and overlying each end of the sleeve 272 and is tightened to compress the sleeve 272 against outer walls of the outlet fitting 214 and the tube 248. Friction between the sleeve 272 and the outer walls of the outlet fitting 214 and the tube 248 maintain the coupling between the outlet fitting 214 and the tube 248.

A shielding member 276 can also be provided around the sleeve 272 to protect the sleeve 272 from damage caused by contact therewith and to restrict bending of the coupling 270 or pivoting between the outlet fitting 214 and the tube 248. Alternatively, the coupling 270 can comprise a rigid no-hub coupling comprised of a PVC, CPVC, ABS, PVDF, or other plastic material, or metal that couples to the outlet fitting 214 and the tube 248 using solvent welding, electro-welding, glues, adhesives, mechanical connections, or the like.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A drain fixture with a modular outlet fitting comprising:
a drain body having a floor with an aperture therethrough;
a coupler having a sidewall with an annular flange extending radially outward from a first end thereof, the annular flange having a diameter larger than the aperture in the drain body and configured to abut a top surface of the drain body, a second end of the sidewall having an outside diameter dimensioned to pass through the aperture in the floor of the drain body and having a plurality of channels therein;
an outlet fitting disposed beneath a bottom surface of the drain body and having a proximate end and at least one distal end, the outlet fitting including a plurality of projections on an interior surface of the proximate end, each of the projections received by a respective one of the channels in the coupler in a locking relationship, and the at least one distal end configured to join with a plumbing system.

2. The drain fixture of claim 1, wherein the interaction of the projections and the channels during rotation of the outlet fitting with respect to the coupler draws the outlet fitting toward the coupler and captures the floor of the drain body between the annular flange on the coupler and the proximate end of the outlet fitting.

3. The drain fixture of claim 2 wherein the annular flange on the coupler comprises a first annular flange and the proximate end of the outlet fitting includes a second annular flange extending radially outward, and wherein the floor of the drain body is captured between the first annular flange on the coupler and the second annular flange on the outlet fitting.

4. The drain fixture of claim 1, further comprising:
a resilient, annular sealing member disposed between the proximate end of the outlet fitting and a bottom surface of the drain body floor.

5. The drain fixture of claim 1, further comprising:
an O-ring disposed between the proximate end of the outlet fitting and a bottom surface of the drain body floor.

6. The drain fixture of claim 1, wherein the channels include one or more detents that resist rotation of the coupler with respect to the outlet fitting.

7. The drain fixture of claim 1, wherein one or more of the channels includes a locking feature that restricts rotation of the coupler with respect to the outlet fitting.

8. The drain fixture of claim 1, wherein the channels are bayonet-style channels.

9. The drain fixture of claim 1, wherein the drain body is nestable with another drain body for stacking for shipment and storage.

10. The drain fixture of claim 1, wherein the outlet fitting is selectable from a plurality of outlet fittings having different styles.

11. The drain fixture of claim 1, wherein the outlet fitting is selectable from a plurality of outlet fittings having different dimensions of the at least one distal end.

12. The drain fixture of claim 1, wherein the at least one distal end of the outlet fitting is chemically or mechanically coupled to the plumbing system.

13. The drain fixture of claim 1, wherein the drain body and the outlet fitting are comprised of dissimilar materials.

14. A drain fixture with a modular outlet fitting comprising:
a drain body having a floor with an aperture therethrough, the drain body being a floor-drain configured for installation in a flooring surface, the drain body including a mounting flange extending about a perimeter thereof and positioned to lie beneath a top surface of the flooring surface;
a coupler having a coupler sidewall with a first annular flange extending radially outward from a first end thereof, a second end of the coupler sidewall having an outside diameter dimensioned to pass through the aperture in the floor of the drain body and including a first mating component of a mechanical coupling;
an outlet fitting disposed beneath the drain body and having at least one distal end that is coupleable to a drain pipe and a proximate end that includes a coupler mating socket including a second mating component of the mechanical coupling, the coupler mating socket sized to extend in overlapping relationship with the second end of the coupler sidewall with the first and second mating components cooperating to form the mechanical coupling, and interaction of the first and second mating components to form the mechanical coupling drawing the outlet fitting toward the first end of the coupler with the floor of the drain body positioned between the annular flange on the coupler and the proximate end of the outlet fitting; and
a resilient sealing element disposed between the proximate end of the outlet fitting and a bottom surface of the drain body floor, the mechanical coupling configured to automatically ensure application of a predetermined compressive force on the sealing element without use of any tools.

15. The drain fixture of claim 14, wherein the annular flange on the coupler comprises a first annular flange and the proximate end of the outlet fitting includes
a second annular flange extending radially outward, and wherein the floor of the drain body is positioned between the first annular flange on the coupler and the second annular flange on the outlet fitting.

16. The drain fixture of claim 14, wherein the first and second mating components each comprise a respective one of a slot or a projection and the mechanical coupling comprises a bayonet-style coupling formed by cooperation of the slot and projection.

17. The drain fixture of claim 14, wherein the drain body and the outlet fitting are comprised of dissimilar materials.

18. A drain fixture with a modular outlet fitting comprising:
a drain body having a floor with an aperture therethrough, the drain body being a floor-drain installed in a concrete flooring surface and being formed from a non-solvent weldable material, the drain body including a mounting flange extending about a perimeter thereof and positioned to lie beneath a top surface of the flooring surface;
a coupler having a coupler sidewall with a annular flange extending radially outward from a first end thereof and abutting a top surface of the drain body, a second end of the coupler sidewall having an outside diameter extending through the aperture in the floor of the drain body and having a first mating component of a mechanical coupling formed thereon; and an outlet fitting having a proximate end abutting a bottom surface of the drain body and at least one distal end coupled to a drain pipe by solvent welding, the proximate end including a coupler mating socket having a second mating component of the mechanical coupling, the coupler mating socket overlapping with the coupler sidewall with the first and second mating components cooperating to form the mechanical coupling, the mechanical coupling capturing the floor of the drain body between the annular flange on the coupler and the proximate end of the outlet fitting.

19. The drain fixture of claim 18 wherein the annular flange on the coupler comprises a first annular flange and the proximate end of the outlet fitting includes a second annular flange extending radially outward, and wherein the mechanical coupling captures the floor of the drain body between the first annular flange on the coupler and the second annular flange on the outlet fitting.

20. The drain fixture of claim 18, wherein the first and second mating components each comprise a respective one of a slot or a projection and the mechanical coupling comprises a bayonet-style coupling formed by cooperation of the slot and projection.

* * * * *